United States Patent [19]

Pedersen

[11] 4,232,209
[45] Nov. 4, 1980

[54] APPARATUS FOR WELDING OF STIFFENERS OR THE LIKE ON A PLATE

[75] Inventor: Einar Pedersen, N. Varasen 7, 5200 Os, Norway

[73] Assignee: Einar Pedersen, Os, Norway

[21] Appl. No.: 941,780

[22] Filed: Sep. 13, 1978

[30] Foreign Application Priority Data

Sep. 15, 1977 [NO] Norway ................................ 773179

[51] Int. Cl.³ .......................... B23K 9/32; B23K 9/12; B23K 9/28
[52] U.S. Cl. ................................. 219/137.41; 219/72; 219/124.32
[58] Field of Search ........... 219/137.41, 125.1, 124.32, 219/75, 72, 74

[56] References Cited

U.S. PATENT DOCUMENTS

| 2,336,283 | 12/1943 | Neill | 219/137.41 |
| 2,470,178 | 5/1949 | Madsen | 219/124.32 |
| 3,849,626 | 11/1974 | Linam et al. | 219/125.1 |
| 4,045,647 | 8/1977 | Thome | 219/72 X |

FOREIGN PATENT DOCUMENTS

| 498620 | 2/1974 | Japan | 219/124.32 |
| 5238824 | 10/1977 | Japan | 219/137.41 |
| 7611234 | 4/1977 | Netherlands | 219/72 |
| 570467 | 8/1977 | U.S.S.R. | 219/137.41 |

OTHER PUBLICATIONS

*The Welding Distributor;* Jan./Feb. 1971, pp. 23-26 "Minimizing The Welding Fume Danger" by Ted B. Jefferson.

Primary Examiner—Roy N. Envall, Jr.
Assistant Examiner—Keith E. George
Attorney, Agent, or Firm—Darby & Darby

[57] ABSTRACT

Apparatus for welding a stiffening member or the like to a plate in which a box is provided having an opening in one wall thereof through which the stiffening plate enters the box. A plurality of guides are mounted to the box for holding welding rods in proximity to the place where the stiffener is to be welded to the plate. A suction source is attached to the box for removing gases, fumes and other like materials produced during the welding operation and the box is positioned relative to the plate and the stiffener.

16 Claims, 2 Drawing Figures

APPARATUS FOR WELDING OF STIFFENERS OR THE LIKE ON A PLATE

The present invention relates to an apparatus for welding stiffeners or the like to a plate, where the stiffeners preferably in advance are tack welded to the plate, comprising a plurality of guiding means for the welding electrodes and current supply for the electrodes.

By welding of so-called panels in shipyards or similar industries a steel plate is equipped with a number of stiffening steel sections, so-called stiffeners. The stiffeners may be positioned on the plate and tack welded by means of a separate apparatus, whereupon the plate is transported to another station for the final welding of the stiffeners. This welding may be performed by hand or by means of a welding machine which is moved along the entire length of the stiffener. In place of welding by hand, individually rigged welding racks are supposed to have been used for automatic guiding of the welding electrodes. Drawbacks of the previously known working methods have been long welding time, substantial rigging work, an untidy working place, pollution by welding gases and a large number of unscreened light arcs at different places necessitating use of masks having a dark glass window in order to prevent dazzling. Such masks introduces a risk and hampers the operator because he has difficulty watching his step, while on the other hand he will risk welding blindness if he tries to reduce the use of the mask.

In order to protect crane operators and other personnel outside the welding stations, it is often used screening curtains surrounding the entire production place. However, this involves considerable extra work like rigging etc.

The present invention aims at reducing the above-mentioned deficiencies and drawbacks. This is obtained according to the invention by means of an apparatus as recited in the main claim. Further advantageous features of the invention will be apparent from the dependent claims.

For improved understanding of the invention it is to be described more closely with reference to the examplifying embodiment shown in the drawings.

Figure 1:
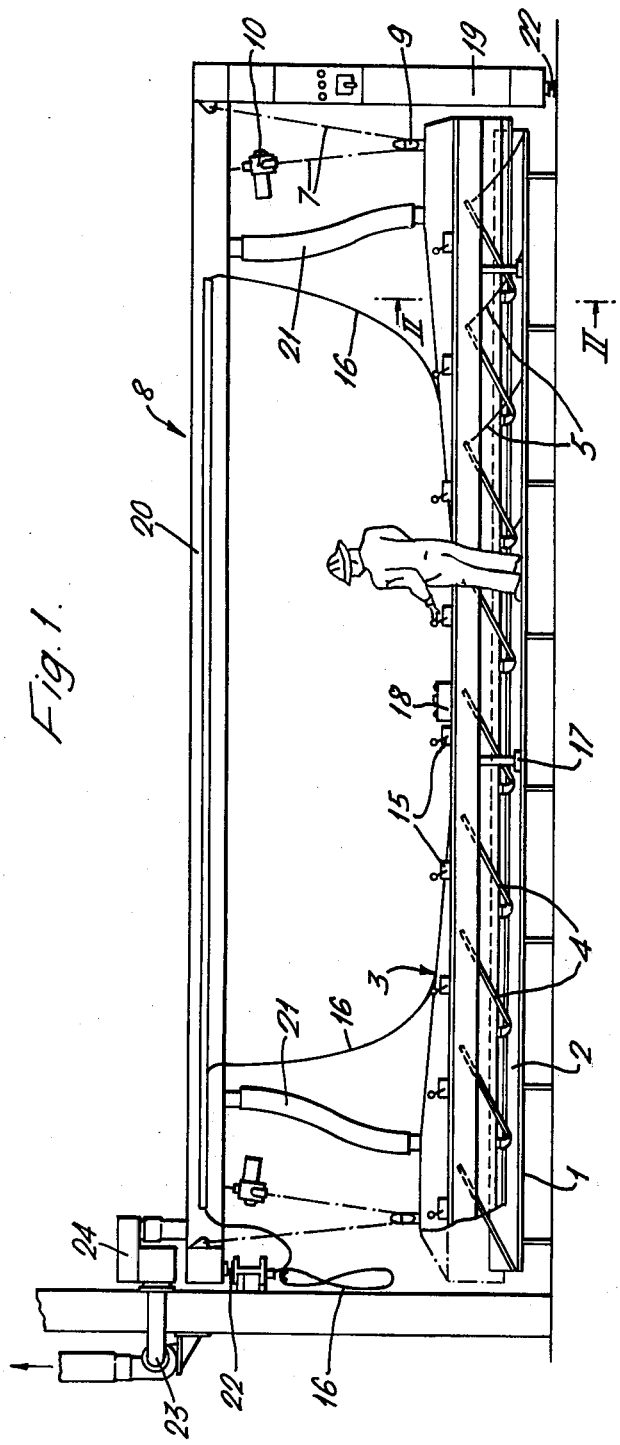
FIG. 1 shows a side view of an apparatus according to the invention.

The examplifying embodiment of the apparatus according to the invention illustrated in the drawing is shown in working position on a plate 1 for welding of a stiffener 2 which in advance has been tack welded to the plate. The apparatus consists basically of a suction box which is generally designated 3 and which is equipped with a plurality of guiding devices 4 for the welding electrodes 5. The suction box 3 extends generally parallel to the stiffener 2 and is equipped at the bottom with a slot 6 into which the stiffener 2 partially extends. The slot is wide enough for a suction opening for welding gases etc. to be formed on either side of the stiffener. The suction box is also equipped with a wire suspension comprising a lifting wire 7 which extends from a gantry-like supporting device 8 over a sheave 9 on the box 3 to a lifting tackle 10 suspended in the gantry 8.

Figure 2:
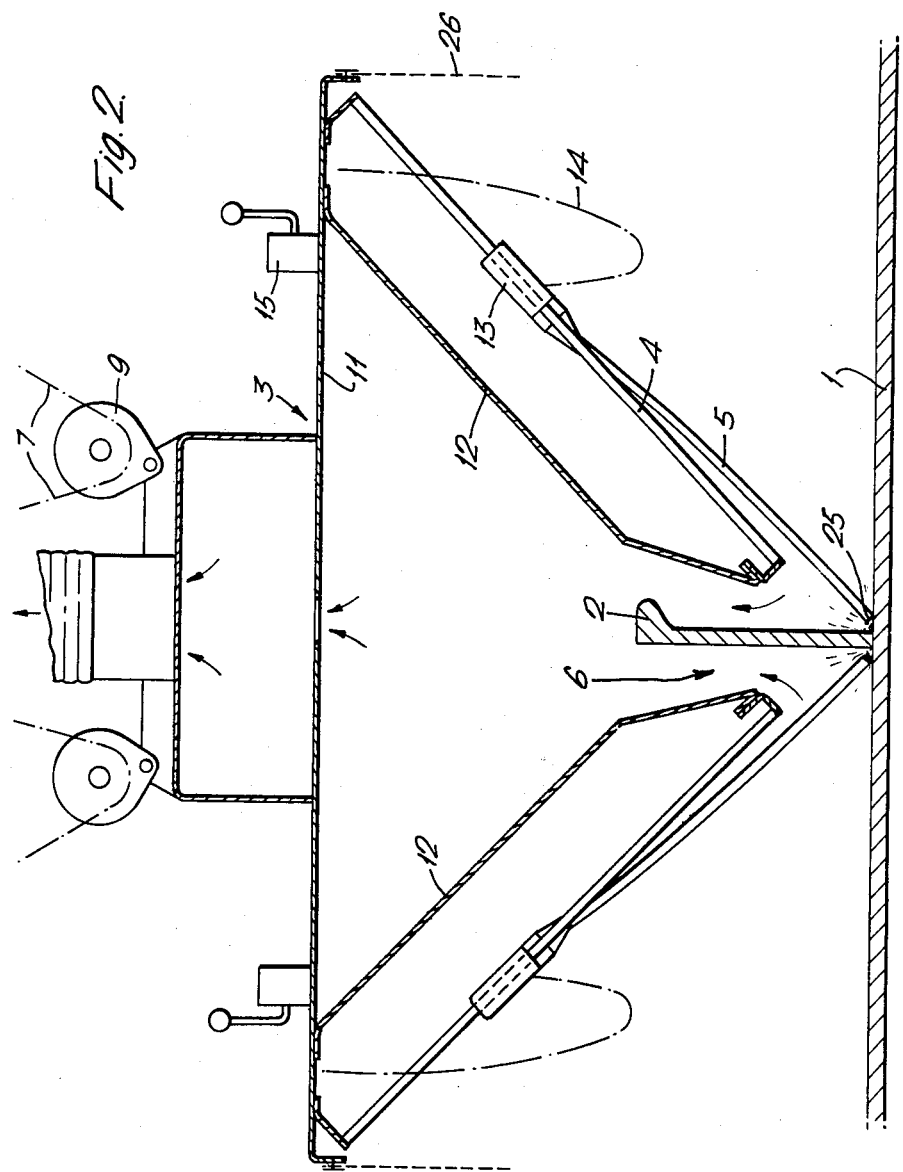
FIG. 2 shows a section along the line II—II in FIG. 1.

As is apparent from FIG. 2, the suction box 3 has a cross section generally in the form of a isosceles triangle where the sides form an angle of about 45° with the base. The slot 6 replaces the apex of the triangle. The guiding devices 4 for the electrodes 5 are attached between the top plate 11 and side walls 12 of the box 3. The guiding devices take the form of straight rods extending parallel to the respective side wall 12 and at an angle with respect to a vertical plane perpendicular to the longitudinal direction of the box. The guiding rods add stiffness to the box. On each of the guiding rods 4 is arranged a glider 13 to which the electrode 5 is attached. A welding current cable 14 leads from a glider through a switch 15 and another cable 16 leads to a welding current source (not shown). The suction box 3 and the rods 4 are arranged symmetrically about a vertical plane through the stiffener 2. Thereby it becomes possible to weld both sides of the stiffener simultaneously.

In addition to the wire suspension, the suction box is equipped with rollers and abutments (not shown) so that it may easily be positioned on the plate prior to the welding operation. The box may be locked in the final position by means of electromagnets 17 which may be operated from the same switch panel 18 as the lifting tackle 10.

The guiding rods 4 are arranged with sufficiently small mutual distance along both sides of the box 3 to permit the welding electrodes 5 to overlap to a certain degree at the end of their travel. A continuous weld along the stiffener 2 is hereby ensured. All the guiding rods 4 are automatically placed in the correct position by the alignment of the suction box. The operator therefore only has to install new electrodes and switch on the current.

The gantry-like supporting device 8 has a vertical leg 19 and a horizontal leg 20, the inner cavity of which serves as suction duct and is connected with the suction box by means of vacuum hoses 21. The gantry 8 is movable along rails 22, and the inner cavity of the upper leg 20 is connected with an exhaust fan 23 by means of a valve carriage 24. During welding, therefore, smoke and gases are sucked up through the slot 6 and further in the direction of the arrows in FIG. 2 through the vacuum hoses 21, the upper leg 20 of the supporting device, the valve carriage 24 and the exhaust fan 23. Concurrently the operator and other personnel are protected from harmful influence of the welding arcs 25 by semi-transparent screens 26. In the embodiment shown the suction box is movably arranged in a supporting device. For the welding of L- or T-sections with unusually wide flanges a hinge arrangement may be desirable in order that the box may be opened about an axis generally parallel to the section and may be slipped down over the section. The suction box may also be visualized as a stationary embodiment and having a flap arrangement which may be swung down over the stiffener after it has been positioned correctly, or the suction box may be stationary but being liftable vertically. It may also be arranged for axial sliding in and out over the section, either in an overhead rail arrangement or on wheels or rollers running on the plate and having adjacent tracks outside the plate.

The suction box may also be visualized consisting of short sections having been joined together in the necessary number in order to fit the length of the workpiece. For workpieces where the weld is not a straight line the suction box may have flexible joints or a certain elasticity in the direction of the walls and have a sufficient number of abutments for the correct positioning of each guiding rod. The guiding rods may advantageously be adjustably connected to the box. This permits overlapping and various forms of zigzag welding by simple adjustments.

There may be a welding transformer for each electrode, or there may be two or more electrodes for each welding transformer and change-over to the successive electrode when the preceding electrode has been consumed. Furthermore, equipment for automatic change-over may be used.

It will be understood from the above that the apparatus according to the invention permits a substantial environment improvement at the worksite while concurrently allowing substantially increased production capacity.

I claim:

1. Apparatus for welding of stiffeners or the like to a plate comprising:
   a box having a longitudinal dimension for accepting a portion of the length of a stiffener, said box having a slot along a wall thereof through which the stiffener extends into the interior of the box,
   means for positioning the box relative to the stiffener to be welded,
   a plurality of guiding means mounted to the box along its length for holding welding electrodes at a position adjacent the place where the stiffener is to be welded to the plate, and
   means for applying reduced gas pressure to the box to remove materials produced during the welding operation.

2. An apparatus according to claim 1 wherein the box and the guiding means are arranged generally symmetrically about a vertical plane through the position of the stiffener.

3. An apparatus according to claim 1 or 2, wherein the guiding means are arranged with sufficiently small mutual distance to permit partial overlapping of the welding electrodes.

4. An apparatus according to claim 1 wherein said positioning means comprises a number of electromagnets for holding the box to the plate.

5. An apparatus according to claim 1 wherein said positioning means comprises rollers and abutments on the box for positioning the box on the plate.

6. An apparatus according to claim 1 further comprising means for raising and lowering said box with respect to the plate.

7. An apparatus according to claim 1 wherein said box is subdivided and hinged together along at least one axis extending generally parallel to the stiffener.

8. An apparatus according to claim 1 further comprising transparent screens on a wall of said box.

9. An apparatus according to claim 1 wherein said box is sub-divided into separately movable sections.

10. An apparatus according to claim 1 wherein the cross section of the box generally has the form of an isosceles triangle and having a generally right top angle.

11. An apparatus according to claim 1 wherein said guiding means are adjustably connected to the box.

12. An apparatus according to claim 11 wherein said guiding means are formed of glide guiding rods.

13. An apparatus according to claim 1 wherein said positioning means comprises a wire suspension extending between the box (3) and a gantry-like supporting means.

14. An apparatus according to claim 13 wherein said supporting means is movable generally transversally of the longitudinal direction of the stiffener.

15. An apparatus according to claim 13 or 14 wherein said supporting means further comprises a housing whose interior is in communication with the interior of said box, said means for applying reduced pressure comprising an exhaust fan communicating with said housing.

16. An apparatus according to claim 15 further comprising a valve carriage interposed between the interior of said housing and said exhaust fan.

* * * * *